(12) United States Patent
Cordua

(10) Patent No.: US 9,702,467 B2
(45) Date of Patent: Jul. 11, 2017

(54) PRESSURE ACTIVATED SEAL

(76) Inventor: Paul M. Cordua, Lindsay, CA (US)

( * ) Notice: Subject to any disclaimer, the term of this patent is extended or adjusted under 35 U.S.C. 154(b) by 222 days.

(21) Appl. No.: 12/949,716

(22) Filed: Nov. 18, 2010

(65) Prior Publication Data
US 2012/0126492 A1 May 24, 2012

(51) Int. Cl.
F16J 15/32 (2016.01)
F16J 15/08 (2006.01)

(52) U.S. Cl.
CPC .... F16J 15/0825 (2013.01); F16J 2015/0856 (2013.01)

(58) Field of Classification Search
USPC .... 277/558, 500, 553, 403; 285/96, 97, 106, 285/109
See application file for complete search history.

(56) References Cited

U.S. PATENT DOCUMENTS

| | | | | |
|---|---|---|---|---|
| 553,738 A * | 1/1896 | Raynsford | | 277/550 |
| 1,590,580 A * | 6/1926 | Hume | | 285/10 |
| 2,218,835 A * | 10/1940 | Ulrich | | 285/109 |
| 2,260,440 A * | 10/1941 | Cunningham et al. | | 92/171.1 |
| 2,778,695 A * | 1/1957 | Sturtevant | | 384/16 |
| 3,572,769 A * | 3/1971 | Lingl | | 285/96 |
| 3,860,270 A * | 1/1975 | Arnold | | 277/625 |
| 4,163,571 A * | 8/1979 | Nash | | 285/106 |
| 4,497,494 A | 2/1985 | Allen et al. | | |
| 4,534,569 A * | 8/1985 | Ishitani et al. | | 277/351 |
| 4,632,403 A * | 12/1986 | Ishitani et al. | | 277/563 |
| 4,676,531 A * | 6/1987 | Martin | | 285/96 |
| 4,819,966 A * | 4/1989 | Gibb | | 285/106 |
| 5,086,691 A * | 2/1992 | von Hatten | | 92/83 |
| 5,429,374 A * | 7/1995 | Eichenberger | | 277/552 |
| 5,779,148 A | 7/1998 | Saarem et al. | | |
| 6,003,848 A * | 12/1999 | Cotter et al. | | 267/64.11 |
| 6,161,834 A * | 12/2000 | Pollack et al. | | 277/300 |
| 6,234,540 B1 * | 5/2001 | Drijver et al. | | 285/98 |
| 6,494,465 B1 * | 12/2002 | Bucknell | | 277/641 |
| 7,497,443 B1 | 3/2009 | Steinetz et al. | | |
| 7,500,620 B2 | 3/2009 | Cordua | | |
| 7,686,308 B2 * | 3/2010 | Van Schoor | | 277/551 |
| 2005/0046180 A1 * | 3/2005 | Tombler et al. | | 285/95 |

* cited by examiner

Primary Examiner — Kristina Fulton
Assistant Examiner — Eugene G Byrd
(74) Attorney, Agent, or Firm — Fulwider Patton LLP

(57) ABSTRACT

A pressure activated seal includes a main wall, side walls connected to the ends of the main wall, and flexible flaps connected to the side walls. The main wall, side walls, and flexible flaps define a main chamber adapted to receive fluid pressure for activating the pressure activated seal to form a seal between opposing adjacent surfaces. The pressure activated seal can be placed between concentric tubes or between adjacent plates, with one of the tubes or plates including one or more orifices leading to the main chamber to allow fluid pressure to activate the pressure activated seal to form a seal between the opposing adjacent surfaces of the tubes or plates.

5 Claims, 3 Drawing Sheets

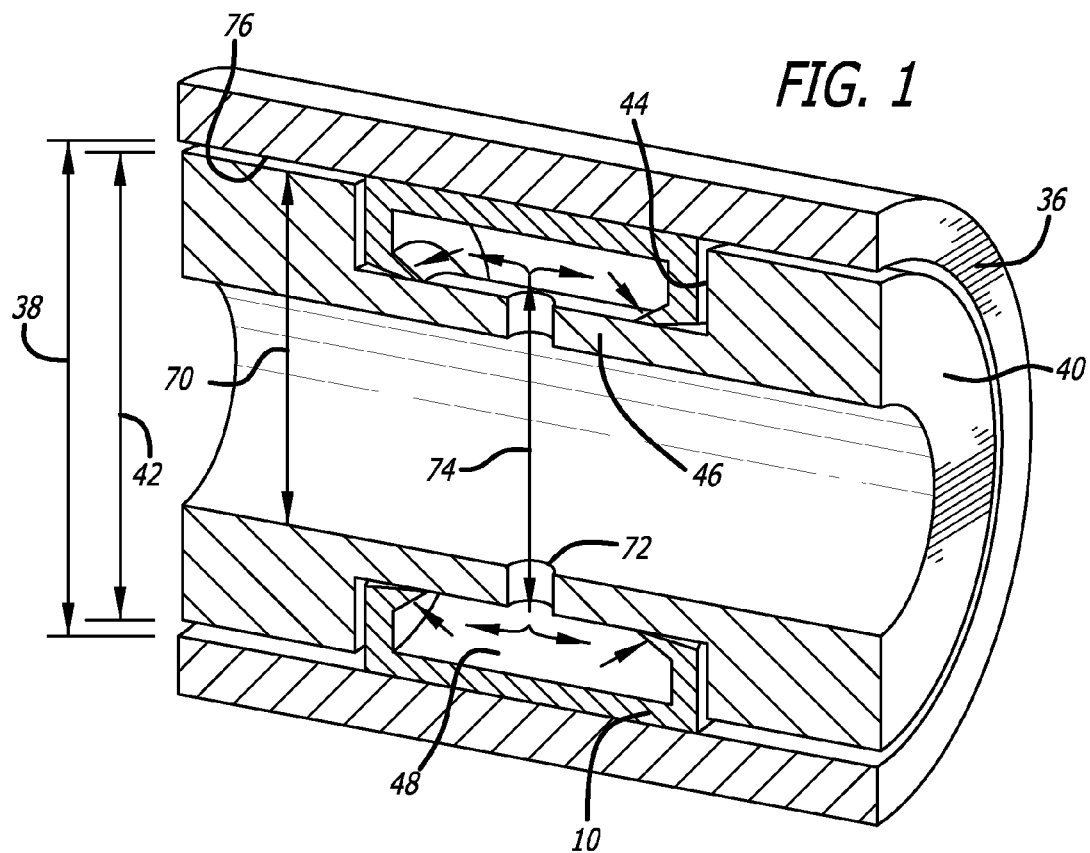
FIG. 1
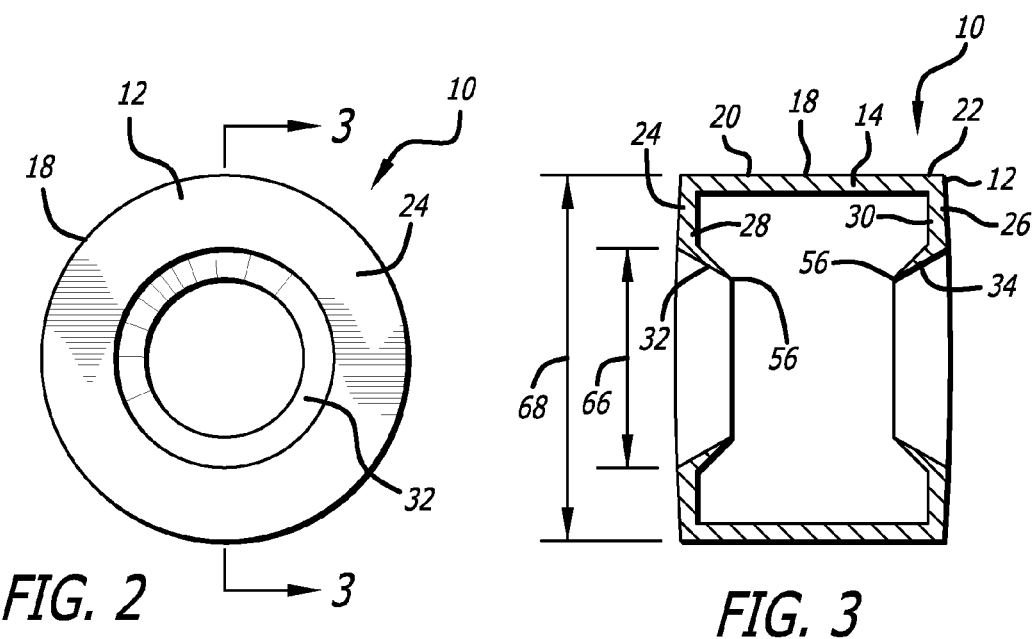
FIG. 2
FIG. 3

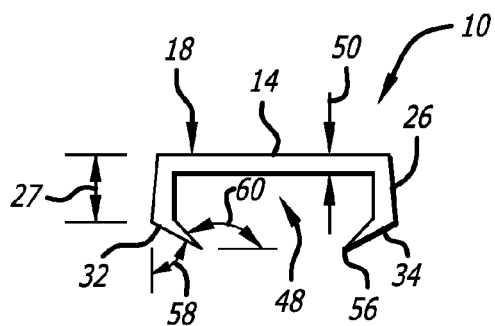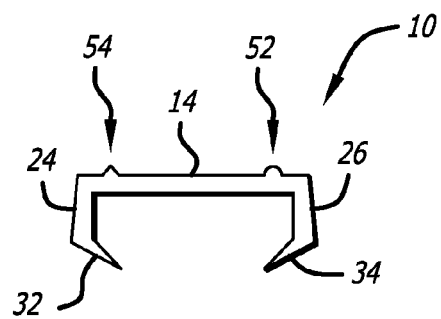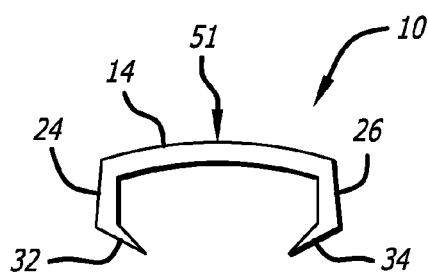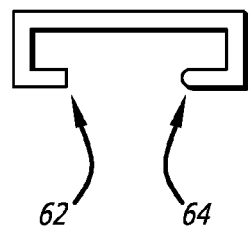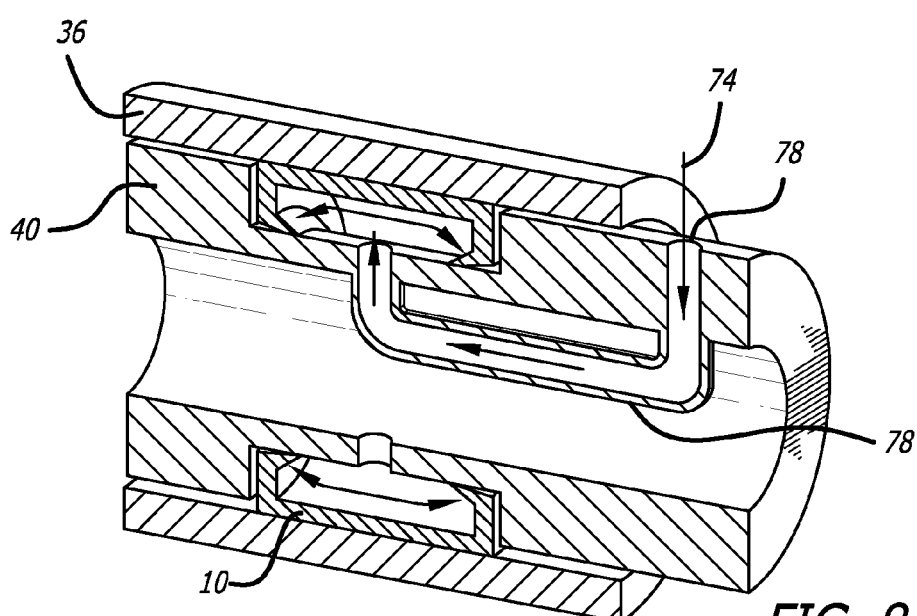

PRESSURE ACTIVATED SEAL

BACKGROUND OF THE INVENTION

This invention relates generally to pressure activated seals, and more particularly relates to a pressure activated seal between two adjacent surfaces, such as between pipes or tubes arranged coaxially one within the other, or adjacent substantially parallel surfaces of two plates, for example.

Seals and gaskets such as O rings are commonly used to seal two adjacent surfaces of pipes or tubes arranged coaxially one within another. Such seals or gaskets are commonly used to seal the outside surface of an inner, relatively smaller diameter tube and the inside surface of an outer, relatively larger diameter tube disposed over the smaller tube, or two flat surfaces. In the case of two adjacent pipes or tubes arranged coaxially one within another, the smaller tube usually has a groove on the outside circumferential surface in which an O ring is inserted. The outside diameter of the O ring is typically slightly larger than the inside diameter of the outer tube, causing a slight compression of the O ring when the outer tube is slipped over the smaller tube, and forming a "seal" that stops liquid or air from passing between the two pipes or tubes. In some cases the inside diameter of the outer tube can become enlarged, for many reasons, particularly if one or both of the inner or outer tubes is eccentric (i.e., not round), or expands, because it made of expandable materials such as plastic, or due to heating, for example. Similarly, spacing between adjacent substantially parallel surfaces of two plates can become enlarged or distorted, such as due to warping of either of the plates, wear, or heating, for example.

It would be desirable to provide a pressure activated seal that can provide a seal between two adjacent surfaces, such as between inner and outer pipes or tubes arranged coaxially, or adjacent substantially parallel surfaces of two plates, for example, to overcome eccentric inside diameters, expanding tubing and other odd shapes, such as oval, square, hexagon or other similar shapes of pipes or tube, as well as warping of adjacent substantially parallel surfaces of adjacent plates having flat or curved shapes. The present invention meets these and other needs.

SUMMARY OF THE INVENTION

Briefly and in general terms, the present invention provides for a pressure activated seal including a main body with a main wall having a main outer sealing surface and first and second ends. First and second side walls are connected to the first and second ends of the main wall, with first ends of the first and second side walls connected to the first and second ends of the main wall, and second ends of the first and second side walls extending away from the main wall. First and second flexible flaps are connected to the second ends of the first and second side walls, respectively, and the main wall, the side walls, and the first and second flexible flaps define a main chamber configured to receive fluid pressure for activating the pressure activated seal, to bias the main outer sealing surface outwardly from the main chamber, and to bias the first and second flexible flaps outwardly from the main chamber. In a presently preferred aspect, the first and second flexible flaps extend generally perpendicular to and inwardly from the first and second side walls. In another presently preferred aspect, each of the first and second flexible flaps of the pressure activated seal gradually narrow from the connection of the first and second flexible flaps to the side walls to a relatively thin edge. In another presently preferred aspect, each of the first and second flexible flaps of the pressure activated seal are formed to have a surface extending at an outside angle of about 15 degrees with respect to the main wall, and a surface extending inwardly at an inside angle of about 60 degrees with respect to the main wall.

Accordingly, in a first presently preferred embodiment, the present invention provides for a combination of a pressure activated seal disposed between an inner tube and an outer tube, for providing a seal between the inner tube and the outer tube. The inner tube has an outside diameter smaller than the inside diameter of the outer tube, and is disposed within the outer tube. The inner tube includes an inner tube wall, and a radially outer channel defined in the inner tube wall, with one or more orifices defined in the inner tube wall, with the one or more orifices extending into and connected in fluid communication with the radially outer channel. A pressure activated seal is disposed radially within the outer tube and radially outside of the inner tube in the radially outer channel of the inner tube. The pressure activated seal has a generally annular body including a radially outer main wall with a radially outer sealing surface, and first and second radially inwardly projecting side walls connected to first and second ends of the radially outer main wall, respectively. The first and second radially inwardly projecting side walls have first and second radially inner ends, respectively, and first and second radially inner flexible flaps are connected to the first and second radially inner ends of the first and second radially inwardly projecting side walls. The radially outer main wall, radially inwardly projecting side walls, and radially inner flexible flaps of the generally annular body of the pressure activated seal define a main chamber of the pressure activated seal, and the one or more orifices defined in the inner tube wall allows fluid pressure to enter the main chamber of the pressure activated seal through the one or more orifices to activate the pressure activated seal to form a seal between the inner tube and the outer tube.

In a presently preferred aspect of the first embodiment, the first and second radially inner flexible flaps extend generally perpendicular to and inwardly from the first and second radially inwardly projecting side walls. In another presently preferred aspect of the first embodiment, each of the first and second radially inner flexible flaps of the pressure activated seal gradually narrow from a relatively thick connection of the first and second radially inner flexible flaps to the first and second radially inner ends of the first and second radially inwardly projecting side walls to a relatively thin edge. In another presently preferred aspect of the first embodiment, each of the first and second radially inner flexible flaps of the pressure activated seal have a radially inner surface extending radially inwardly at an outside angle of about 15 degrees with respect to the radially outer main wall, and a radially outer surface extending radially inwardly at an inside angle of about 60 degrees with respect to the radially outer main wall, causing a decrease in wall thickness of the first and second radially inner flexible flaps from the relatively thick connection of the first and second radially inner flexible flaps to the first and second radially inner ends of the first and second radially inwardly projecting side walls to a relatively thin edge. In another presently preferred aspect of the first embodiment, one or more auxiliary tubes are provided in the inner tube, and a first end of the one or more auxiliary tubes is connected to a corresponding one of the one or more orifices, respectively, while a second end of the one or more auxiliary tubes is connected to an outside source of fluid pressure, so that fluid pressure can enter the main chamber of the pressure activated seal and activate the radially outer sealing surface of the pressure activated seal.

In a second presently preferred embodiment, the present invention provides for a combination of a pressure activated seal disposed between an inner tube and an outer tube, for providing a seal between the inner tube and the outer tube. The inner tube has an outside diameter smaller than the inside diameter of the outer tube, and is disposed within the outer tube. The outer tube includes a radially inner channel defined in the outer tube wall and one or more orifices defined in and extending through the outer tube wall and connected in fluid communication with the radially inner channel of the outer tube. A pressure activated seal is disposed radially within the outer tube and within the radially inner channel of the outer tube. The pressure activated seal has a generally annular body with a radially inner main wall providing a radially inner sealing surface. First and second radially outwardly projecting side walls are connected to first and second ends of the radially inner main wall, respectively, and first and second radially outer flexible flaps are connected to first and second radially outer ends of the first and second radially outwardly projecting side walls, respectively, The radially inner main wall, the radially outwardly projecting side walls, and the radially outer flexible flaps of the generally annular body define a main chamber, so that the one or more orifices defined in the outer tube wall allows fluid pressure from outside the outer tube to enter the main chamber of the pressure activated seal through the one or more orifices of the outer tube, to activate the pressure activated seal to form a seal between the inner tube and the outer tube.

In a presently preferred aspect of the second embodiment, the first and second radially outer flexible flaps extend generally perpendicular to and inwardly from the first and second radially outwardly projecting side walls. In another presently preferred aspect of the second embodiment, each of the first and second radially outer flexible flaps of the pressure activated seal gradually narrow from a relatively thick connection of the first and second radially outer flexible flaps to the first and second outer ends of the first and second radially outwardly projecting side walls to form a relatively thin edge. In another presently preferred aspect of the second embodiment, each of the first and second radially outer flexible flaps of the pressure activated seal have a radially outer surface extending radially outwardly at an outside angle of about 15 degrees with respect to the radially inner main wall, and a radially inner surface extending radially outwardly at an inside angle of about 60 degrees with respect to the radially inner main wall, causing a decrease in wall thickness of the first and second radially outer flexible flaps from the relatively thick connection of the first and second radially outer flexible flaps to the first and second radially outer ends of the first and second radially outwardly projecting side walls to a relatively thin edge.

In a third presently preferred embodiment, the present invention provides for a combination of a pressure activated seal disposed between first and second adjacent plates having substantially parallel adjacent exterior surfaces. The first plate has a sealing side with an exterior surface, and the second plate is disposed adjacent to the first plate, with a sealing side of the second plate having an exterior surface facing the exterior surface of the sealing side of the first plate. The first and second plates are preferably placed adjacent to each other in spaced apart relation with the exterior surface of the sealing side of the second plate preferably substantially parallel to the exterior surface of the sealing side of the first plate. The second plate includes a wall on the sealing side and one or more channels defined in the wall on the sealing side of the second plate, one or more orifices formed in and extending through the wall of the second plate and connected in fluid communication with the one or more channels. A pressure activated seal is disposed between the sealing side of the first plate and the sealing side of the second plate within the one or more channels defined in the wall of the second plate. The pressure activated seal includes a main body with a main wall having a main outer sealing surface, and first and second side walls connected at first ends of the first and second side walls to the first and second ends of the main wall, with opposing second ends of the first and second side walls extending away from the main wall. The first and second side walls also include first and second inner flexible flaps connected to the second ends of the first and second side walls. The main wall, the side walls, and the flexible flaps of the main body of the pressure activated seal define a main chamber, and the one or more orifices extending into the one or more channels of the second plate allowing fluid pressure from outside the second plate to enter the main chamber of the pressure activated seal, for activating the pressure activated seal, to bias the main outer sealing surface outwardly from the main chamber, and to bias the first and second flexible flaps outwardly from the main chamber, so as to form a seal between the first and second plates.

In a presently preferred aspect of the third embodiment, the first and second flexible flaps extend generally perpendicular to and inwardly from the first and second side walls. In another presently preferred aspect of the third embodiment, each of the first and second flexible flaps of the pressure activated seal gradually narrow from the connection of the first and second flexible flaps to the side walls to a relatively thin edge. In another presently preferred aspect of the third embodiment, each of the first and second flexible flaps of the pressure activated seal are formed to have a surface extending at an outside angle of about 15 degrees with respect to the main wall, and a surface extending inwardly at an inside angle of about 60 degrees with respect to the main wall.

These and other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 1 is a schematic perspective diagram of a first embodiment of the pressure activated seal of the present invention in combination with inner and outer tubes.

FIG. 2 is an end view of the pressure activated seal of FIG. 1.

FIG. 3 is a cross-sectional view of the pressure activated seal taken along line 3-3 of FIG. 2.

FIGS. 4-7 is a cross-sectional view of a portion of the pressure activated seal as shown in FIG. 3, illustrating variations of the pressure activated seal of FIG. 1.

FIG. 8 is a schematic perspective diagram of a variation of the first embodiment of the pressure activated seal of the present invention in combination with inner and outer tubes.

DETAILED DESCRIPTION OF THE PREFERRED EMBODIMENTS

Figure 9:
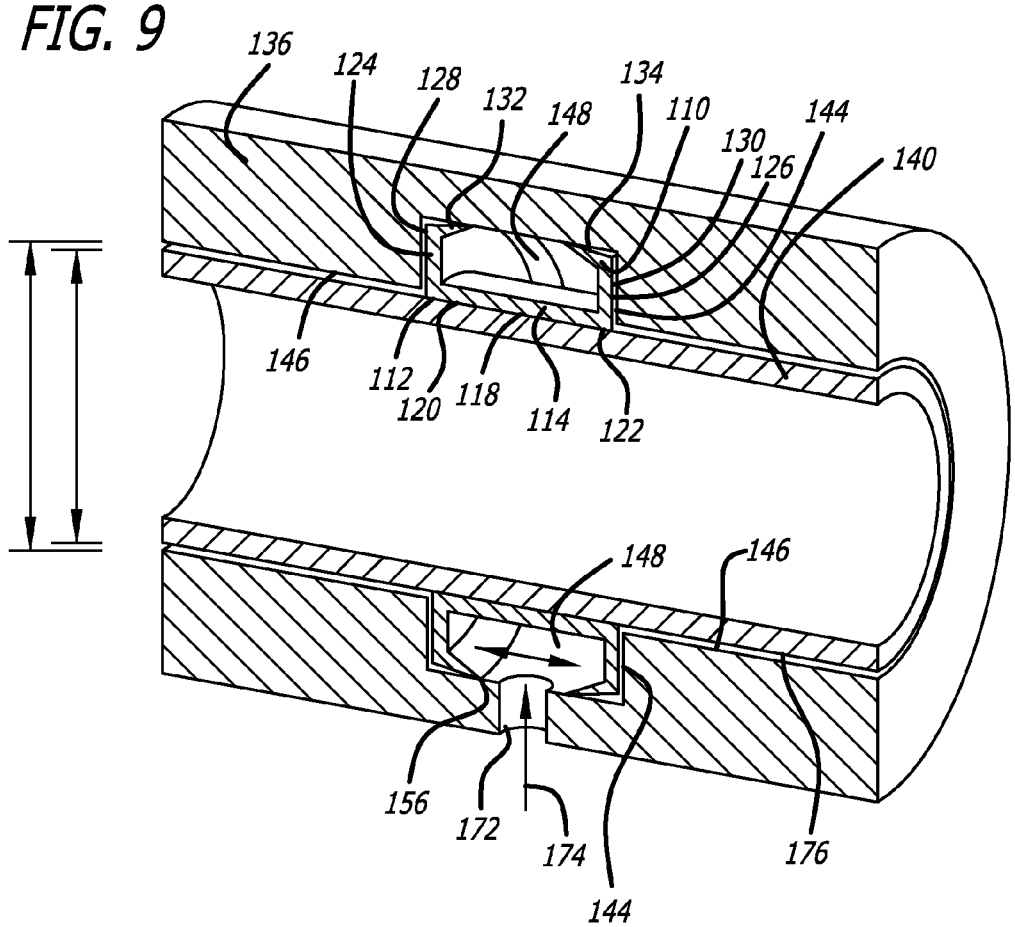
FIG. 9 is a schematic perspective diagram of a second embodiment of the pressure activated seal of the present invention in combination with inner and outer tubes.

Referring to the drawings, which are provided by way of example, and not by way of limitation, in a first preferred embodiment, illustrated in FIGS. 1-8, the present invention provides for a pressure activated seal 10 having generally annular body 12 including radially outer main wall 14 having a thickness and a radially outer sealing surface 18. The main wall has first and second ends 20, 22, and first and second radially inwardly projecting side walls 24, 26, are connected to the first and second ends of the radially outer main wall, respectively. The first and second radially inwardly projecting side walls project radially outwardly a distance generally determining a thickness 27 of the pressure activated seal, and have first and second radially inner ends 28, 30, respectively, and first and second radially inner edges or flexible flaps 32, 34, that are connected to the first and second radially inner ends of the first and second radially inwardly projecting side walls.

Referring to FIG. 1, in the first embodiment, the pressure activated seal is configured to be disposed radially within an outer tube 36 having an inside diameter 38, and radially outside of an inner tube 40 having an outside diameter 42 smaller than the inside diameter of the outer tube, and within a radially outer channel or groove 44 defined in a wall 46 of the inner tube, to provide a pressure activated seal between the inner tube and the outer tube. As is illustrated in FIGS. 1 and 3-8, the first and second radially inner edges or flexible flaps can extend generally perpendicular to and inwardly from the first and second radially inwardly projecting side walls, for example, or can be any similar suitable form so as to facilitate forming a seal against the groove. The radially outer main wall, radially inwardly projecting side walls, and radially inner edges or flexible flaps of the generally annular body define a main chamber 48. The thickness 50 of the radially outer main wall can be varied as desired according to the desired use of the pressure activated seal, and the desired hardness, rigidity, and flexibility of the pressure activated seal.

The sealing surface of the main wall of the pressure activated seal can be flat, as shown in FIGS. 1, 3 and 4, or can be angled, radiused or rounded 51 as shown in FIG. 6. The sealing surface may also be provided with various designs of protrusions, such as protruding rounded bumps 52, or sharply angular protruding bumps 54, as shown in FIG. 5, for example.

In another aspect, each of the first and second radially inner edges or flexible flaps of the pressure activated seal preferably gradually narrow or taper from the relatively thick connection of the first and second radially inner edges or flexible flaps to the first and second radially inner ends of the first and second radially inwardly projecting side walls to a relatively thin radius, feather edge or intersecting point 56. In another aspect, each of the first and second radially inner edges or flexible flaps of the pressure activated seal are preferably formed to have a radially inner surface extending radially inwardly at an outside angle 58 of about 65 degrees with respect to the adjacent radially inwardly projecting side wall, or of about 15 degrees with respect to the radially outer main wall, and a radially outer surface extending radially inwardly at an inside angle 60 of about 60 degrees with respect to the radially outer main wall, for example, causing a decrease in wall thickness of the first and second radially inner edges or flexible flaps from the relatively thick connection of the first and second radially inner edges or flexible flaps to the first and second radially inner ends of the first and second radially inwardly projecting side walls to a relatively thin radius, feather edge or intersecting point. As is illustrated in FIG. 7, the first and second radially inner edges or flexible flaps of the pressure activated seal alternatively may terminate in squared ends 62, or rounded ends 64, or ends of similar suitable desirable shapes.

The pressure activated seal is inserted into the radially outer channel or groove of the inside tube in a manner similar to the way an O ring is installed. The depth of the radially outer channel or groove is determined by the inside diameter 66 and the outside diameter 68 of the pressure activated seal. The outside diameter of the pressure activated seal may be equal to, slightly bigger or slightly smaller than the outside diameter 70 of the radially outer channel or groove. When the pressure activated seal is installed in the radially outer channel or groove, the first and second radially inner edges or flexible flaps collapse radially inwardly and lay horizontally in the radially outer channel or groove. The pressure activated seal is not stretched on the outside diameter, as the first and second radially inner edges or flexible flaps collapse.

One or more orifices 72 are formed through the wall of the inner tube extending into the radially outer channel or groove, allowing fluid pressure 74 from inside the smaller tube to enter the main chamber of the pressure activated seal. As the fluid pressure inside the inner tube increases, the radially outer main wall and radially outer sealing surface of the pressure activated seal can expand outwardly and exert fluid pressure on the inside surface 76 of the outer tube creating a seal. The fluid pressure in main chamber of the pressure activated seal is equally spread to the entire inside walls of main chamber of the pressure activated seal, also exerting fluid pressure to the first and second radially inwardly projecting side walls and the first and second radially inner edges or flexible flaps of the pressure activated seal, causing a complete seal between the inner and outer tubes. If for any reason the inside diameter of the outer tube is "out of round" or eccentric, the radially outer sealing surface of the pressure activated seal will take this form and cause a seal. For example, if the inner tube and outer tube were to have a square cross-sectional configuration, the pressure activated seal could be made square. When fluid pressure is communicated to the main chamber of the pressure activated seal from the inner square tube, the pressure activated seal will expand and seal the inside of the outer square tube.

The shape of the main chamber located on the inside diameter of the pressure activated seal can be made in any desired shape, such as curved, radius, square or rectangular shapes, depending on the desired pressure calculations and sealing method desired. The outside diameter of the pressure activated seal can be made to be bigger than the inside diameter of the outer tube to cause a seal when no fluid pressure is present. Alternatively, the outside diameter of the pressure activated seal can be smaller, which can allow a "flushing" action to occur when fluid pressure is introduced in the inner tube, as it may be desirable for fluid to flow past the seal until a certain fluid pressure is attained in the system for the pressure activated seal to form a seal between the inner tube and the outer tube.

In some instances the pressure activated seal may be activated by an outside source of fluid pressure. For example, in a variation of the first embodiment, one or more small auxiliary tubes 78 can be inserted into or formed in the inner tube and connected to the corresponding one or more orifices, respectively, extending through the wall of the inner tube extending into the radially outer channel or groove, as shown in FIG. 8. An outside source of fluid pressure can then enter the main chamber of the pressure activated seal and activate the radially outer sealing surface of the pressure activated seal.

In a second presently preferred embodiment illustrated in FIG. 9, the pressure activated seal can be used to form a seal between inner and outer tubes by activation from an outside source of fluid pressure, such as may be suitable for use when the wall thickness of an inner tube is too thin to install a groove for activation of the pressure activated seal. In the second embodiment, a pressure activated seal 110 has a generally annular body 112 with a radially inner main wall 114 having a thickness and a radially inner sealing surface 118 having first and second ends 120, 122. First and second radially outwardly projecting side walls 124, 126 are connected to the first and second ends of the radially inner main wall, respectively. The first and second radially outwardly projecting side walls have first and second radially outer ends 128, 130, respectively, and first and second radially outer edges or flexible flaps 132, 134, are connected to the first and second radially outer ends of the first and second radially outwardly projecting side walls. The first and second radially inner edges or flexible flaps can extend generally perpendicular to and inwardly from the first and second radially outwardly projecting side walls, for example, or can be any similar suitable form so as to facilitate forming a seal against the groove. The thickness of the radially inner main wall can be varied as desired according to the desired use of the pressure activated seal, and the desired hardness, rigidity, and flexibility of the pressure activated seal.

The pressure activated seal is configured to be disposed radially within an outer tube 136 having an inside diameter 138, and radially outside of an inner tube 140 having an outside diameter 142 smaller than the inside diameter of the outer tube, within a radially inner channel or groove 144 defined in a wall 146 of the outer tube to provide a pressure activated seal between the inner tube and the outer tube. The radially inner main wall, radially outwardly projecting side walls, and radially outer edges or flexible flaps of the generally annular body define a main chamber 148.

The sealing surface can be flat, angled, radiused or rounded as discussed above. The sealing surface may also be provided with various designs of protrusions, such as protruding rounded bumps, or sharply angular protruding bumps, for example. In a presently preferred aspect, each of the first and second radially outer edges or flexible flaps of the pressure activated seal preferably gradually narrows or tapers from the relatively thick connection of the first and second radially outer edges or flexible flaps to the first and second radially outer ends of the first and second radially inwardly projecting side walls to a relatively thin radius, feather edge or intersecting point 156. In a presently preferred aspect, each of the first and second radially outer flexible flaps of the pressure activated seal preferably are formed to have a radially outer surface extending radially outwardly at an outside angle of about 15 degrees with respect to the radially inner main wall, and a radially inner surface extending radially outwardly at an inside angle of about 60 degrees with respect to the radially inner main wall, for example, causing a decrease in wall thickness of the first and second radially outer flexible flaps from the relatively thick connection of the first and second radially outer flexible flaps to the first and second radially outer ends of the first and second radially outwardly projecting side walls to a relatively thin radius, feather edge or intersecting point. As discussed above, the first and second radially inner edges or flexible flaps of the pressure activated seal alternatively may terminate in squared ends, or rounded ends, or ends of similar suitable desirable shapes.

The pressure activated seal is inserted into the radially inner channel or groove of the outer tube in a manner similar to the way an O ring is installed. As previously described, the depth of the radially inner channel or groove is determined by the inside diameter and the outside diameter of the pressure activated seal. The inside diameter of the radially inner channel or groove may be equal to, slightly bigger or slightly smaller than the inside diameter of the pressure activated seal. When the pressure activated seal is installed in the radially inner channel or groove, the first and second radially inner edges or flexible flaps collapse radially outwardly and lay horizontally in the radially inner channel or groove. The pressure activated seal is not stretched on the inside diameter, as the first and second radially outer edges or flexible flaps collapse.

One or more orifices 172 are formed through the wall of the outer tube extending into the radially inner channel or groove, allowing fluid pressure 174 from outside the smaller tube to enter the main chamber of the pressure activated seal. As the fluid pressure outside the inner tube increases, the radially inner main wall and radially inner sealing surface of the pressure activated seal can expand inwardly and exert fluid pressure on the outside surface 176 of the inner tube creating a seal. The fluid pressure in main chamber of the pressure activated seal is equally spread to the entire inside walls of main chamber of the pressure activated seal, also exerting fluid pressure to the first and second radially outwardly projecting side walls and the first and second radially outer edges or flexible flaps of the pressure activated seal, causing a complete seal between the inner and outer tubes.

The shape of the main chamber located on the inside diameter of the pressure activated seal can be made in any desired shape, such as curved, radius, square or rectangular shapes, depending on the desired pressure calculations and sealing method desired. The inside diameter of the pressure activated seal can be made to be smaller than the outside diameter of the inner tube to cause a seal when no fluid pressure is present. Alternatively, the inside diameter of the pressure activated seal can be larger, which can allow a "flushing" action to occur when fluid pressure is introduced in the outer tube, as it may be desirable for fluid to flow past the seal until a certain fluid pressure is attained in the system for the pressure activated seal to form a seal between the inner tube and the outer tube.

Figure 10:
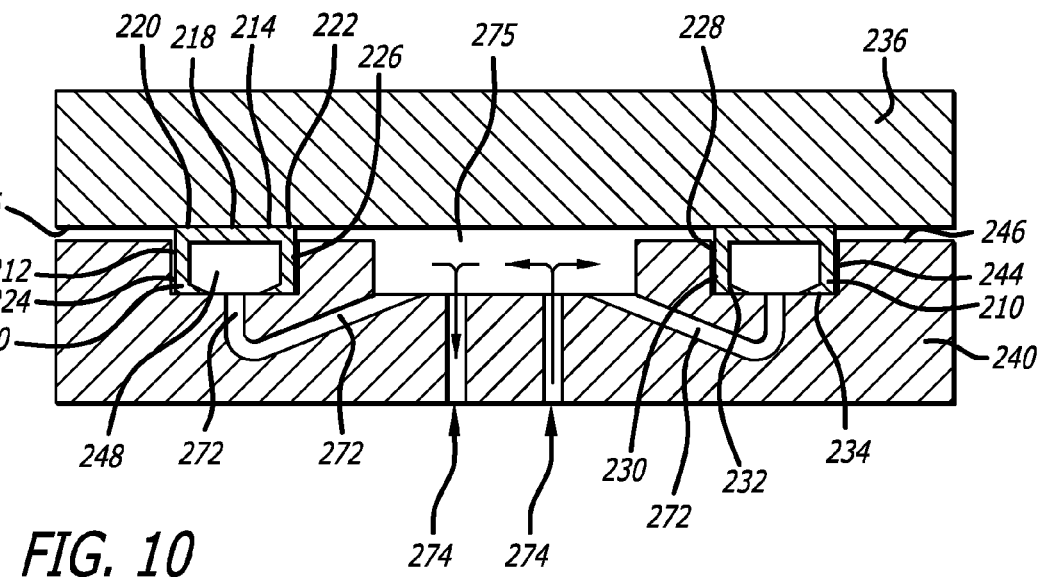
FIG. 10 is a schematic perspective diagram of a third embodiment of the pressure activated seal of the present invention in combination with adjacent plates.

In a third presently preferred embodiment, the present invention provides for a pressure activated seal 210 that can be used for providing a seal between two or more plates or flat surfaces put together as is illustrated in FIG. 10, such as for use in cooling channels or other fluid flow channels, for example. The pressure activated seal includes a main body 212 including a main wall 214 having a thickness, and a main outer sealing surface 218 having first and second ends 220, 222. First and second side walls 224, 226 have first ends 228 connected to the first and second ends of the main wall, and second ends 230 that extend away from the main wall. First and second inner edges or flexible flaps 232, 234, are connected to the second ends of the first and second side walls.

The pressure activated seal is configured to be disposed between a first plate 236 and a second plate 240, within one or more channels or grooves 244 defined in a wall 246 of the second plate to provide a pressure activated seal between the first and second plates. The first and second edges or flexible flaps typically extend generally perpendicular to and inwardly from the first and second side walls, for example, or can be any similar suitable form so as to facilitate forming a seal against the channel or groove. The main wall, side walls, and edges or flexible flaps of the main body of the pressure activated seal define a main chamber 248.

The thickness of the main wall can be varied as desired according to the desired use of the pressure activated seal, and the desired hardness, rigidity, and flexibility of the pressure activated seal. The sealing surface can be flat as shown in FIG. 10, or can be angled, or radiused or rounded, for example. The sealing surface may also be provided with various designs of protrusions, such as protruding rounded bumps, or sharply angular protruding bumps, as discussed above.

In a presently preferred aspect, each of the first and second edges or flexible flaps of the pressure activated seal preferably gradually narrows or tapers from the relatively thick connection of the first and second edges or flexible flaps to the side walls to a relatively thin radius, feather edge or intersecting point as described above. In another presently preferred aspect, each of the first and second edges or flexible flaps of the pressure activated seal preferably are formed to have a surface extending at an outside angle of about 15 degrees with respect to the main wall, and a surface extending radially inwardly at an inside angle of about 60 degrees with respect to the main wall, for example, causing a decrease in wall thickness of the first and second edges or flexible flaps from the relatively thick connection of the first and second edges or flexible flaps to the ends of the first and second side walls to a relatively thin radius, feather edge or intersecting point. The flexible flaps of the pressure activated seal alternatively may terminate in squared ends, or rounded ends, or ends of similar suitable desirable shapes.

The pressure activated seal is inserted into the channel or groove of the second plate in a manner similar to the way a gasket is installed. The depth of the channel or groove is determined by the thickness of the main wall and length of side walls of the pressure activated seal. One or more orifices 272 are formed through the wall of the second plate extending into the one or more channels or grooves, respectively, allowing fluid pressure 274 from outside the second plate, such as through a cooling channel 275, for example, to enter the main chamber of the pressure activated seal. As the fluid pressure increases, the main wall and sealing surface of the pressure activated seal can expand and exert fluid pressure on the surface 276 of the first plate creating a seal. The fluid pressure in main chamber of the pressure activated seal is equally spread to the entire inside walls of main chamber of the pressure activated seal, also exerting fluid pressure to the first and second side walls and the first and second edges or flexible flaps of the pressure activated seal, causing a complete seal between the first and second plates.

The shape of the main chamber located on the inside diameter of the pressure activated seal can be made in any desired shape, such as curved, radius, square or rectangular shapes, depending on the desired pressure calculations and sealing method desired. If for any reason the two surfaces are not securely fastened to one another the sealing surface would be activated by the fluid pressure and move against the plate causing a seal. If the surfaces of the first and second plates were not perfectly parallel, the sealing surface of the pressure activated seal would expand more in the area needed to seal.

As has been demonstrated, the pressure activated seal of the present invention is activated by fluid pressure. The sealing surfaces can vary to make up inconsistencies in surfaces, diameters and irregular shapes to form a seal. The softer the material is for making the pressure activated seal the more small irregularities in the surface can be sealed. Activation of the pressure activated seal by application of fluid pressure in the chamber of the pressure activated seal forces a sealing surface of the pressure activated seal to seal against any adjacent surface of a tube or plate, having a round, flat, angled or any other similar shape, for example, to attain a seal.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In combination, a pressure activated seal disposed between an inner tube and an outer tube, comprising:
   an outer tube having an inside diameter;
   an inner tube disposed within said outer tube, said inner tube having an interior space containing a fluid having a fluid pressure, and a wall having an outside diameter smaller than the inside diameter of the outer tube, the wall of the inner tube having a radially inner surface in fluid communication with the fluid, the wall of the inner tube having a radially outer surface in fluid communication with the fluid, the radially outer surface of the wall of the inner tube defining a radially outer channel in the wall of the inner tube, the wall of the inner tube defining at least one orifice extending through the wall of the inner tube from within the interior space of said inner tube to an interior of said radially outer channel, said at least one orifice being configured to communicate said fluid of said inner tube from within said inner tube through said at least one orifice into said radially outer channel; and
   a pressure activated seal disposed radially within said outer tube and disposed radially outside of said inner tube within said radially outer channel of said inner tube, said pressure activated seal having a generally annular body including a radially outer main wall having a radially outer sealing surface opposing an inner sealing surface of said radially outer channel of said inner tube, first and second ends, and first and second radially inwardly projecting side walls connected to the first and second ends of the radially outer main wall, respectively, said first and second radially inwardly projecting side walls having first and second radially inner ends, respectively, and first and second radially inner flexible flaps connected to said first and second radially inner ends of said first and second radially inwardly projecting side walls, said first and second radially inner flexible flaps being configured to flex radially inwardly, said radially outer main wall, radially inwardly projecting side walls, and radially inner flexible flaps of the generally annular body defining a main chamber connected in fluid communication with said interior space and said fluid in said interior space in said inner tube through said at least one orifice, such that said pressure activated seal is configured to receive said fluid from within said inner tube, wherein said at least one orifice defined through the wall of the inner tube allows said fluid pressure of said fluid of said inner tube to enter the main chamber of the pressure activated seal through said at least one orifice to bias said radially outer sealing surface outwardly from said main chamber and to bias said first and second flexible flaps to flex outwardly from said main chamber and causing said first and second flexible flaps to transfer said fluid pressure within the main chamber against said radially outer channel by pressing against the immediately surrounding portions of said at least one orifice in a direction towards said at least one orifice, and wherein said radially outer sealing surface of said radially outer main wall of said generally annular body of said pressure activated seal includes a plurality of protrusions;

said combination further comprising each of said first and second radially inner flexible flaps of the pressure activated seal have a radially inner surface extending radially inwardly at an outside angle of about 15 degrees with respect to the radially outer main wall, and a radially outer surface extending radially inwardly at an inside angle of about 60 degrees with respect to the radially outer main wall, causing a decrease in wall thickness of the first and second radially inner flexible flaps from the relatively thick connection of the first and second radially inner flexible flaps to the first and second radially inner ends of the first and second radially inwardly projecting side walls to a relatively thin edge.

2. The combination of claim 1, wherein said first and second radially inner flexible flaps extend generally perpendicular to and inwardly from said first and second radially inwardly projecting side walls.

3. The combination of claim 1, wherein each of said first and second radially inner flexible flaps of the pressure activated seal gradually narrow from a relatively thick connection of the first and second radially inner flexible flaps to said first and second radially inner ends of the first and second radially inwardly projecting side walls to a relatively thin edge.

4. The combination of claim 1, wherein said plurality of protrusions comprises rounded bumps.

5. The combination of claim 1, wherein said plurality of protrusions comprises angular protruding bumps.

* * * * *